April 26, 1955 N. J. POWLICK 2,707,113
TOWING MECHANISM FOR TRACTOR DRAWN VEHICLES
Filed Feb. 24, 1953
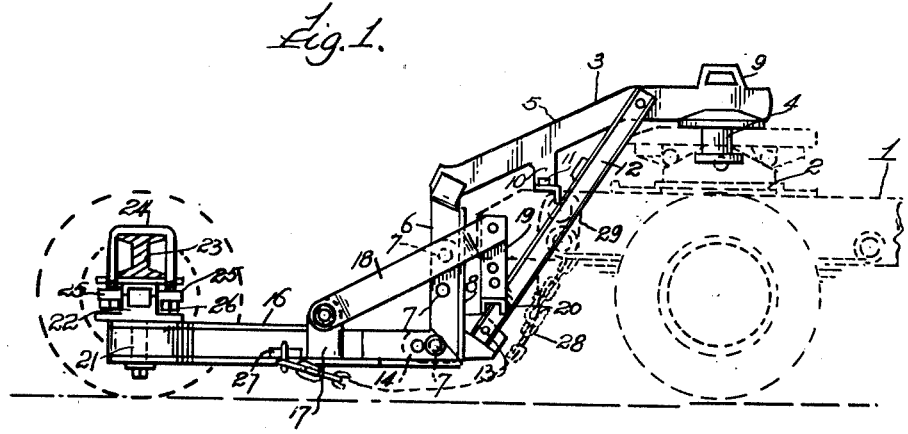
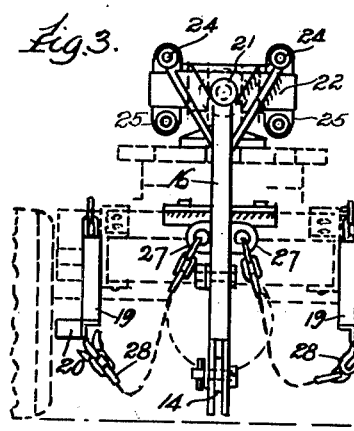
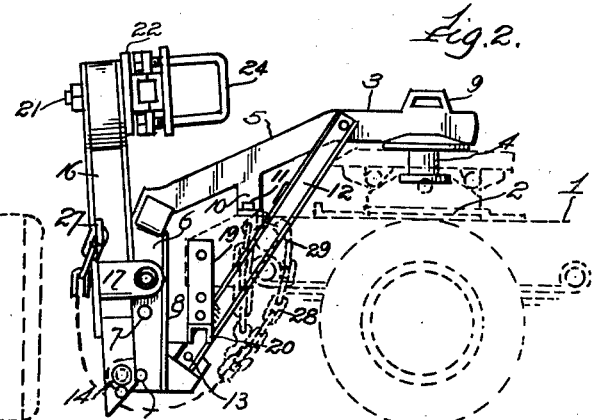
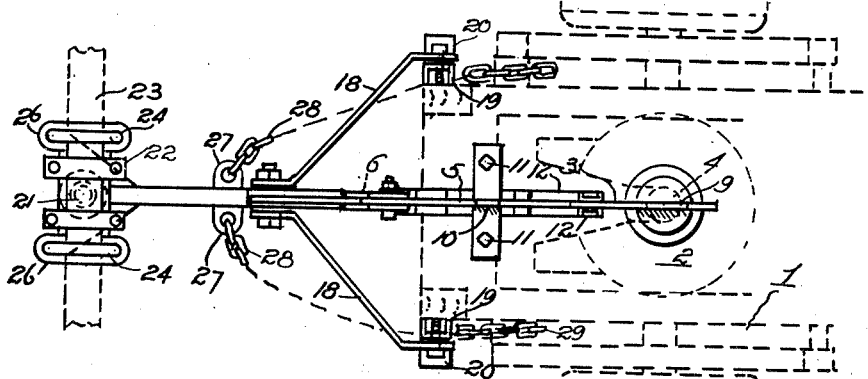
INVENTOR.
Nicholas J. Powlick.
BY
H. J. Sanders
Attorney.

United States Patent Office 2,707,113
Patented Apr. 26, 1955

2,707,113

TOWING MECHANISM FOR TRACTOR DRAWN VEHICLES

Nicholas J. Powlick, Chicago, Ill.

Application February 24, 1953, Serial No. 338,426

2 Claims. (Cl. 280—418)

This invention relates to trailer towing mechanism and more particularly to structure attachable to the tractor fifth wheel to provide a positive method of towing smoothly, safely and dependably that requires little or no attention on the part of the tractor driver and that is positive and efficient in operation.

A further object is to provide trailer towing mechanism operable without permitting bobbing or weaving of the unit being towed, that is compact in assembly so that it takes up but little space between the tractor and the towed unit, that is capable of long or short turns with facility, that may be backed up readily, that is of sturdy but light weight construction and that is inexpensive to manufacture.

Further objects and advantages will be apparent from the following description and claims when considered with the accompanying drawing, wherein:

Fig. 1 is a side view of the instant towing mechanism illustrating its application.

Fig. 2 is a side view of the mechanism in folded inoperative position attached to a tractor.

Fig. 3 is a rear end view of Fig. 2, and,

Fig. 4 is a top plan view of Fig. 1.

The reference numeral 1 denotes a tractor provided with the fifth wheel 2 to which the instant towing device is secured that includes a drawbar 3 provided with a draftpin 4 for operative engagement with the fifth wheel, said drawbar being substantially L-shape but with the longer side 5 disposed almost horizontally and the shorter side 6 disposed vertically, the sides being integral or welded together, the side 6 formed with spaced perforations 7 and faced with a plate 8, the side 5 formed with a handle 9 and secured to the tail end of the tractor by a leg 10 secured by bolts 11 to the tractor.

The drawbar side 5 is connected by braces 12 to a stud 13 projecting from said plate 8, said braces passing through an opening in the tractor frame. Pivotally and releasably secured to an ear 14 projecting from the drawbar side 6 is the towbar 16 provided with a stud 17 pivotally connected by auxiliary braces 18 to brackets 19 secured to the tail end of the tractor, in the operative position of the mechanism, said brackets being angular and at their lower ends extending outwardly to form terminal portions 20 which may serve as temporary rests or supports for parts of the device during assembly. In the inoperative position of the mechanism the braces 18 are removed and the stud 17 secured by a bolt directly to the drawbar side 6, said towbar having been manually moved to raised position, as shown in Fig. 2, and also secured by a bolt to the ear 14 in this position.

Pivotally arranged upon a pin 21 carried by the towbar 16 is a turntable 22 adapted to receive the front axle 23 of the vehicle being towed which axle is temporarily retained in this position during the towing operation by inverted U-shaped yokes 24 the inverted threaded ends of which pass through ears 25 of the turntable, the yokes receiving said axle which is made fast by nuts 26 applied to the threaded ends of said yokes. The trailer front end is raised into position upon the turntable 22 by a small conventional lifting jack carried for this purpose. To further secure the towing mechanism to the tractor the towbar 16 is provided with ears 27 engaged by chains 28 which are passed about a sheave 29 upon the tractor frame, the hook at the end of the chain then being secured to a chain link in conventional manner.

What is claimed is:

1. In towing mechanism for a tractor drawn vehicle, a drawbar having a pin for pivotal engagement with the tractor fifth wheel, a leg connecting said drawbar to the tractor rear end, braces connecting opposite ends of said drawbar to each other and passing through the tractor frame, a towbar connected to said drawbar, brackets secured to the rear end of the tractor frame, auxiliary braces connecting said towbar and said brackets detachably, a turntable operatively carried by said towbar for receiving a vehicle axle, and yoke means for releasably securing the vehicle axle to said turntable.

2. In towing mechanism for a tractor drawn vehicle, a drawbar pivotally secured to the tractor fifth wheel, braces connecting opposite ends of said drawbar to each other and passing through an opening in the tractor frame, a towbar detachably secured to said drawbar, a stud carried by said towbar, brackets carried by the tractor, auxiliary braces detachably connecting said brackets to said stud, a turntable carried by said towbar for receiving a vehicle axle in the operative position of said towbar, and yoke means for releasably securing the vehicle axle to said turntable.

References Cited in the file of this patent

UNITED STATES PATENTS

| | | |
|---|---|---|
| 1,445,754 | Casey | Feb. 20, 1923 |
| 1,902,212 | Bonge | Mar. 21, 1933 |
| 2,153,468 | Heyn | Apr. 4, 1939 |
| 2,325,869 | Mosling | Aug. 3, 1943 |